Patented June 7, 1932

1,862,322

UNITED STATES PATENT OFFICE

WILLIAM G. SOLEY, OF LA SALLE, NEW YORK, ASSIGNOR TO THE CARBORUNDUM COMPANY, OF NIAGARA FALLS, NEW YORK, A CORPORATION OF PENNSYLVANIA

SAPONACEOUS EMULSION AND PRODUCT CONTAINING THE SAME

No Drawing.   Application filed November 23, 1926.   Serial No. 150,380.

This invention relates to a composition of matter in the nature of an emulsion, together with a product containing the same, and a method of making the emulsion.

For various purposes, particularly in making detergent, polishing and abrasive pastes and compounds, a medium is desired of a semi-solid consistency, which will act as a base, vehicle, binder or carrier of more or less chemically inert particles. Many materials and compositions have been used for this purpose, including starch paste, soft soap, greases, etc., but all of these have defects which make their use for some applications undesirable. Starch pastes dry out and ferment; soft soap permits segregation when diluted to give the proper consistency; greases lack mobility and change in consistency with temperature changes; jellies lack mobility and readily dry out.

I have discovered that an improved medium, or vehicle, can be obtained by making an emulsion of soap, water, and an essential oil. An essential oil, for general purposes, is defined as a substance of an oily nature obtained, as a rule, from vegetable sources, possessed usually of odor, generally liquid, although sometimes semi-solid at ordinary temperatures, and volatile without decomposition (see Thorpe Dictionary of Applied Chemistry, 1912 edition, vol. 3, page 730). Emulsions of this type are stable, and maintain a given consistency over long periods of times and under widely different atmospheric conditions. Consequently, they are peculiarly adaptable as a vehicle for detergent, abrasive and polishing compounds, pastes and the like.

I am aware that emulsions of soap, and fixed or fatty oils, have long been known, but the properties of such emulsions render them not entirely satisfactory for carriers of polishing, detergent or abrasive particles.

According to my invention, an emulsion is made from any of the metallic salts of fatty acids, and generally termed "soaps", sodium soap preferably being used, water, and an essential oil, preferably an oil derived from trees of the Pinus, or pine family.

As an example, I take 10 parts, by weight, of sodium soap; 20 parts, by weight, of water, and mix them until softening of the soap has been obtained and a homogeneous mass developed. To this mixture I add slowly, while vigorously agitating the mass, 10 parts, by weight, of oil of turpentine. This mixing, beating, or agitating of the mass, is continued until a homogeneous emulsion results.

The invention is not restricted, however, to the use of sodium soap, and some other essential oils, which may be used in place of turpentine, are pine oil, rosin oil, camphor oil, cedarwood oil, cinnamon oil and clove oil.

To this emulsion there may be added abrasive grits, such as silicon carbide particles, fused aluminous abrasives, and the like, to form a paste which is useful in lapping surfaces, valve seats, etc. Similarly, ground pumice could be used in place of abrasives, the composition then being useful as a detergent compound. Extremely fine non-abrasive polishing material, such as "rotten stone", may also be used in the carrier in place of pumice or abrasive particles. In this form, the composition is valuable for polishing varnished or lacquered surfaces. For the purposes of the present application, the material which may be added, such as abrasives, pumice, or "rotten stone" are termed "abrasive particles".

For some purposes, it is desirable to make a stiffer body, or vehicle, than is secured by the emulsion alone. This may be accomplished by adding clay, or clay-like materials, such as bentonite, to the emulsion. For example, four parts of the above described emulsion may be combined with one part of bentonite to give a vehicle having a stiffer body than the emulsion alone.

The advantages of the essential oil emulsion are its peculiar mobile cream-like consistency, it ability to support and hold in suspension, a considerable quantity of solid particles, such as the surface treating particles, without losing this mobility; its stability under widely different conditions of temperature and mechanical shocks; and its easy removal by means of water, gasoline, or other readily available solvents.

The last mentioned point of advantage is of considerable importance, especially when the composition contains abrasive particles for lapping surfaces, valve seats and the like, because it can be readily removed by water or gasoline. Its peculiar oil-like consistency also makes it especially adaptable for such purposes. In addition, the essential oils have the peculiar property of causing the abrasive grains to "bite", especially on hard materials, and consequently a valve lapping compound of this type will cut faster and give a better finish than those heretofore produced with other kinds of vehicles or carriers.

While I have illustrated certain preferred constituents, it will be understood that the invention is not limited to the particular materials specified, nor to the exact proportions set forth.

I claim:

1. An abrasive composition comprising a cream-like emulsion of soap, water and an essential oil wherein the soap comprises substantially 10 parts by weight of the mixture, the oil constitutes 10 parts by weight, and the water constitutes 20 parts by weight, and having abrasive particles therein.

2. An abrasive composition comprising a cream-like emulsion of soap, water and an essential oil together with abrasive particles, and having bentonite mixed therewith as a stiffening material, the composition containing substantially 20% of soap, 20% of oil, 20% of bentonite and 40% of water.

3. An abrasive paste comprising a carrier having abrasive particles distributed therein and held in suspension thereby, said carrier comprising a cream-like emulsion of soap, water, an essential oil and a thickening material, the soap and oil together constituting not more than half the composition of the carrier, the water constituting not substantially more than half and the thickening material being sufficient to impart a cream-like consistency to the emulsion and make it of such viscosity as to support the abrasive particles therein.

4. An abrasive paste comprising a thick cream-like emulsion of soap, water, oil of turpentine and a stiffening material and having abrasive particles distributed therethrough and held in suspension thereby, the soap and turpentine being in substantially equal proportions by weight and approximately equal to the weight of the water, the quantity of thickening material being sufficient to secure a thick cream-like consistency necessary for holding the abrasive particles in suspension.

In testimony whereof I have hereunto set my hand.

WILLIAM G. SOLEY.